United States Patent [19]

Echigo et al.

[11] Patent Number: 5,721,031
[45] Date of Patent: Feb. 24, 1998

[54] FIBER-REINFORCED POROUS PLASTIC TUBE

[75] Inventors: Yoshiaki Echigo; Yoshiaki Iwaya; Kiyotaka Nakanishi, all of Uji, Japan

[73] Assignee: Unitika Ltd., Hyogo, Japan

[21] Appl. No.: 403,897

[22] PCT Filed: Jul. 20, 1994

[86] PCT No.: PCT/JP94/01194

§ 371 Date: Mar. 21, 1995

§ 102(e) Date: Mar. 21, 1995

[87] PCT Pub. No.: WO95/03164

PCT Pub. Date: Feb. 2, 1995

[30] Foreign Application Priority Data

Jul. 21, 1993 [JP] Japan ................. 5-201854

[51] Int. Cl.$^6$ ............... B01D 29/11; D32B 1/08; B29D 9/00; B29D 22/00
[52] U.S. Cl. ............ 428/36.4; 428/36.5; 428/36.92; 156/184; 156/242; 264/267; 264/241; 264/257; 210/504
[58] Field of Search ................. 428/36.4, 36.5, 428/36.92, 357; 156/60, 184, 242; 264/267, 241, 251, 29.5; 162/146; 210/504

[56] References Cited

U.S. PATENT DOCUMENTS

| | | | |
|---|---|---|---|
| 3,767,054 | 10/1973 | Farrow et al. | 210/232 |
| 4,339,334 | 7/1982 | Eguchi et al. | 210/433.2 |
| 4,376,675 | 3/1983 | Perrotta | 162/145 |
| 4,523,995 | 6/1985 | Pall et a. | 210/504 |
| 4,973,382 | 11/1990 | Kinn et al. | 162/146 |
| 5,264,162 | 11/1993 | Salem et al. | 264/29.5 |
| 5,529,844 | 6/1996 | Degen et al. | 428/357 |

FOREIGN PATENT DOCUMENTS

| | | |
|---|---|---|
| 1303316 | 6/1992 | Canada. |
| 0475412 | 3/1992 | European Pat. Off.. |
| 2396231 | 1/1979 | France. |
| 1485586 | 9/1977 | United Kingdom. |

OTHER PUBLICATIONS

English Translated Copy of FR 2 396 231.

*Primary Examiner*—Kathleen Choi
*Attorney, Agent, or Firm*—Wenderoth, Lind & Ponack

[57] ABSTRACT

The present invention provides a fiber-reinforced porous plastic tube which is essentially composed with fibers having a high tensile modulus such as glass fibers and a matrix resin such as polyethylene, and has continuous pores, and excellent mechanical strength. This porous tube is useful for structural materials in a building and/or construction, filters, diffusing tubes, drain materials and the like.

14 Claims, No Drawings

FIBER-REINFORCED POROUS PLASTIC TUBE

This application is a 371 of PCT/SP94/01194 filed Jul. 20, 1994.

TECHNICAL FIELD

The present invention relates to a porous plastic tube which has continuous pores in the tube wall, high mechanical strength, and smooth external and internal surfaces.

BACKGROUND OF THE INVENTION

A porous plastic tube has been used as structural materials for architecture and construction, because it has merits that the consumption of the plastics can be minimized, and the rigidity of the tube can be improved by increasing the thickness of the tube wall owing to the existence of the continuous pores in the tube wall.

Further, it has been used as a filter material, a diffusing tube and the like utilizing the continuous pores.

A sinter-forming process using resinous powders as a raw material has been known as a method of producing such a porous plastic tube as described in KOGYO ZAIRYO, Vol. 32, No.4.

According to the conventional sinter-forming process, a porous plastic tube has been made by filling the resin powders into a double-cylindrical mold, and heating it near the melting point of the resin so as to only adhere the surface of the resin powders, and then removing the product from the mold.

The porous tube obtained by the above process, however, is low in strength because the resin powder is only melt-adhered on the points of surface of the powders.

Further, there is a problem that the continuous porosity can be obtained at most about 50% by volume.

In the meanwhile, porous plastic tubes have been known, which were formed in the shape of a pipe with fibers alone using thermo-adhesive composite fibers without any binder such as an adhesive agent at all, but such tubes are usually made by steps of filling webs containing thermo-adhesive composite fibers between the an outer cylinder and an inner cylinder of a combination mold, subjecting them to heat, cooling, and then removing them from the mold.

This method, however, includes problems that the length of the mold is limitative because the fibers are filled from one end of the mold, and the thickness thereof is also limitative because the whole of the mold should be heated, so that only a small tube can be produced, and the strength against compression is low.

Japanese Patent Application KOKOKU 56-43139 discloses a process of production of a hollow cylindrical fiber molded product in which a fiber layer of a given width containing thermo-adhesive composite fibers is wound on a core as reducing the bulkiness and elasticity as pressed by the dead load of the wound fibers to provide a given porosity, and then cooled, and after that the core is taken out from the wound fiber in order to improve the above defects. This process has merits that according to the method described therein a hollow cylinder having any desirable size can be prepared, and even a small size one can be efficiently produced by cutting one which has the same shape but a longer size, and the porosity can be freely controlled within 50–90% by volume. But, the problems have not been solved that they are porous plastic tubes formed in a pipe shape and made of fibers having a small tensile modulus, and have a small bulk density and a small compressive strength in general.

As apparent from the above, the objects of the present invention are first to provide a fiber-reinforced porous plastic tube having a high compression strength and a large continuous porosity, and secondly to provide a method of producing the aforementioned fiber-reinforced porous plastic tube using a composite sheet obtained from matrix resins and fibers for reinforcement.

DISCLOSURE OF THE INVENTION

As the results of our study to solve the above problems, it has been found that a porous plastic tube which has continuous pores and is reinforced with high modulus fibers exhibits a high mechanical strength, and the continuous porosity can be optionally controlled by selecting the conditions for the production.

The first feature of the present invention is a fiber-reinforced porous plastic tube having continuous pores which comprises a matrix resin and fibers for reinforcement which have an average fiber length of 1–50 mm, and the fibers for the reinforcement are contained in an amount from 5–500 parts by weight based on 100 parts by weight of the matrix resin.

According to the preferable embodiments of the present invention, a fiber-reinforced plastic porous tube having continuous pores comprises a matrix resin and fibers for reinforcement; said fibers have an average length of 1–50 mm, and are contained in the amount of 5–500 parts by weight based on 100 parts by weight of the matrix resin, and the average pore size in the surface of the porous plastic tube is not larger than 5 μm.

According to further preferable embodiments of the present invention, a fiber-reinforced porous plastic tube having continuous pores comprises a matrix resin and fibers for reinforcement, said fibers have an average length of 1–50 mm and a tensile modulus of not less than 1000 kg/mm$^2$, and are contained in the amount of 5–500 parts by weight based on 100 parts by weight of the matrix resin.

The present invention further relates to a process for producing a fiber-reinforced porous plastic tube which comprises the following four steps:

(1) a step in which 100 parts by weight of the matrix resin and 5–500 parts by weight of the reinforced fibers having an average length of 1–50 mm are dispersed in water to give a composite, and then it is formed into a sheet, (2) a step in which the sheet is pressed under heating, and then cooled to be compacted, (3) a step in which the compacted sheet is wound at least one time to give a tube, which is then inserted into a mold, and (4) a step in which the wound sheet is expanded by heating the mold.

Further, it is preferable to use the process comprising the following four steps in order to obtain a porous plastic tube of the present invention having an average pore size of not larger than 5 μm:

(1) a step in which 100 parts by weight of the matrix resin and 5–500 parts by weight of the reinforced fibers having an average length of 1–50 mm are dispersed in water to give a composite, and then it is formed into a sheet, (2) a step in which the sheet is laminated with a microporous film having an average pore size of not larger than 5 μm, (3) a step in which the above sheet is wound at least one time to give a tube, which is then inserted into a mold, and (4) a step in which the sheet is expanded by heating the mold.

The present invention will be explained in detail hereafter.

The porous tube of the present invention comprises fibers for reinforcement and a matrix resin. As the fibers for reinforcement, organic or inorganic fibers may be used, preferably pitch or PAN type carbon fibers, glass fibers, para-aramid fibers, alumina fibers and the like having a tensile modulus of not less than 1000 kg/mm$^2$, more preferably 2,000–30,000 kg/mm$^2$. These may be used alone or mixed.

The average length of the fibers for reinforcement should be 1–50 mm, preferably 3–25 mm. In case that the average length of the fiber is shorter than 1 mm, the thermal expansion becomes insufficient so that a porous tube having a smooth surface and sufficient strength is hardly obtained. In case that the average length of the fibers exceeds 50 mm, the thermal expansion becomes insufficient, and an excellent uniformity of the fibers and the matrix resin is hardly achieved.

The average diameter of the fibers for reinforcement is preferably 2–100 μm, more preferably 5–50 μm.

As a matrix resin according to the present invention, heat fusible polymers which are solid at an ambient temperature may be used. The term "heat fusible" means that polymer particles are deformed by heat to be able to bind each other to one body, and the heat fusible polymer may be a thermoplastic resin or a thermosetting resin.

As heat fusible polymers, hydrophobic water insoluble addition polymers are preferably exemplified. These polymers can be used in the form of powder or dispersion. Suitable heat fusible polymers include addition polymers and condensation polymers, for example, polyolefin resins such as polyethylene, including super high molecular polyethylene, chlorinated polyethylene, polypropylene and the like, polycarbonate, ethylene/acrylic acid copolymer, polypropylene, nylon, phenylene oxide resin, phenylene sulfide resin, polyoxymethylene, polyester, acrylonitrile/butadiene/styrene copolymer, polyvinyl chloride, copolymer of vinylidene chloride as a main ingredient and at least one other α,β-ethylenically unsaturated monomer polymerizable with the vinylidene chloride as a subsidiary ingredient, styrene homo- or copolymer, phenol resin, and polyimide resin. Of these polymers, polyolefin resin such as polyethylene, including super high molecular polyethylene, chlorinated polyethylene and polypropylene, or phenol resin is preferable.

The matrix resin of the present invention is preferably used in the form of powder, with a diameter not larger than 0.40 mm, more preferably 0.04–0.40 mm.

According to the present invention, the ratio of the fibers for reinforcement to the matrix resin should be 5–500 parts by weight of the fibers, preferably 10–300 parts by weight, and most preferably 20–200 parts by weight based on 100 parts by weight of the matrix resin.

In case that the ratio of the fibers for reinforcement is less than 5 parts by weight based on 100 parts by weight of the matrix resin, the continuous pores are difficult to be formed because the thermal is insufficiently made, whereas in case that the ratio is more than 500 parts by weight a sheet obtained is difficultly formed into a cylinder.

The porous tube of the present invention has continuous pores, for example, a porous tube having numerous continuous pores within the tube wall between the external surface and the internal surface of the wall. It can be determined according to the following method whether or not the tube wall has continuous pores.

When 1 cc of ethanol is dropped on the external surface of the wall of a porous tube by a pipet, and the ethanol sinks into the porous tube within 10 seconds, the pores in the tube are judged as continuous. As the sinking time of the ethanol is shorter, the continuous porosity in the porous tube is higher.

Particularly, the porous tube of the present invention has a high continuous porosity, such as 90% by volume at maximum. The continuous porosity (cp) can be calculated by the following equation:

$$cp = \frac{A - B}{A} \times 100$$

wherein A (g/cm$^3$) represents theoretical density of the sheet which consists of a matrix resin and fibers for reinforcement and has no continuous pore, B (g/cm$^3$) represents the apparent density of the porous tube prepared from the above sheet.

The porous tube of the present invention may be in the form of real circle, ellipse, ovate, or another suitable cross sectional shape.

The porous tube of the present invention, especially one having an average pore size of not larger than 5 μm in the surface is useful for a cylindrical filter.

The porous tube of the present invention may optionally contain any other ingredients. For example, fillers may be added in the amount of 10–33% by weight. The fillers may include SiO$_2$ (Novacite), CaCO$_3$, MgO, CaSiO$_3$ (wollastonite) and mica. Pigments or dyes may be added in order to make the tube opaque or colored. Various kinds of chemicals such as antioxidants, ultraviolet stabilizers, foaming agents, defoaming agents, fungicides and the like may be used.

The porous tube of the present invention can be produced according to following process for instance.

Fibers for reinforcement in an amount of 5–500 parts by weight based on 100 parts by weight of the matrix resin powders are dispersed into water according to the process described in U.S. Pat. No. 4,426,470 to make a composite and then make a sheet, and the sheet is pressed under heat, and cooled to give a compacted sheet.

When the fibers for reinforcement and resin powders are dispersed into water to make a composite, for example, binding agents are preferably used in the amount of 0.1–5 parts by weight based on 100 parts by weight of the matrix resin, most preferably 0.3–3 parts by weight. Examples of such binding agents include a polymer latex containing a substantially water-insoluble organic polymer containing an anionic or a cationic charge such as acryl polymer or styrene/butadiene polymer having a sulfonium group, a sulfoxonium group, an isothiouronium group, a pyridinium group, a quaternary ammonium group, a sulfate group, a sulfonate group or a carboxylate group.

As a binding agent, starch, especially a linear starch such as natural starch or core starch or a chemically or enzymatically modified starch including a cationic starch may be used.

Organic coagulating agents may be preferably used when composites are prepared from the fibers for reinforcement and resin powders in water. As such organic coagulating agents aluminum polychloride (aluminum hydroxy chloride), partially hydrolyzed polyacrylamide, modified cationic polyacrylamide, diaryl diethyl ammonium chloride and the like are exemplified. The addition amount of the coagulating agents is less than about 3 parts by weight, especially less than about 1 parts by weight based on 100 parts by weight of the matrix resin.

After production of a composite from the fibers for reinforcement and the matrix resin in water a wet sheet which is separated from water according to a method of making paper is dried, and one or more sheets are laminated, pressed with heat, and then pressed under cooling.

The temperature at the press with heat is preferably higher than the melting point of the matrix resin by 10°–20° C., and the pressure is preferably 5–100 kg/cm².

Further, a compacted sheet with a thickness of 0.1–1 mm and a weight of 100–1000 g/m² can be obtained by cold pressing at 10°–50° C. under the same pressure. The continuous porosity of the sheet is preferably not more than 30% by volume, more preferably not more than 20% by volume, particularly preferably about not more than about 10% by volume.

These sheets are wound at least one time, preferably 2–10 times to make a tube, and the tube obtained is inserted into a mold. The mold used is preferably made of metal or carbon in view of the heat conductivity. After that the mold is put in an oven which is heated over the melting point of the matrix resin, preferably at a temperature higher than it by 10°–50° C. and kept for 10–300 minutes. The tubular sheet is thermo-expanded by the action of the fibers for reinforcement. The mold is taken out from the oven, and the tube is removed from the mold after cooling to give a porous tube of the present invention.

When a fiber-reinforced plastic porous tube having an average pore size of not larger than 5 μm on the surface is produced, the composite sheet aforementioned and a microporous film having an average pore size of not larger than 5 μm are laminated, and the sheet is wound at least one time, followed by being inserted into a mold, and then the mold with the wound sheet is heated according to the same process aforementioned to give an objective fiber-reinforced plastic porous tube.

When the microporous film having an average pore size of not larger than 5 μm is laminated on the most external surface of the tubular sheet a compacted sheet laminated with a microporous film may be used when the sheet is wound one time, but a compacted sheet which is laminated with a microporous film on a portion corresponding to the lastly wound portion may be used when the tubular sheet has two or more layers, or the tubular sheet may be finally covered with a compacted sheet laminated with a microporous film on the portion corresponding to the last wound portion. In some cases a nonwoven fabric laminated with a microporous film may be wound at least one time on the surface of the tubular sheet.

The microporous film used in the present invention is any film which has an average pore size of 5 μm or less, but a microporous film made of polyolefin resin of 50–150 μm in thickness is preferable, which is commercially available with ease. When polyethylene or ethylene copolymer is used as a matrix resin, a microporous film of polypropylene, polypropylene copolymer, including super high molecular polyethylene is used in view of heat adhesion, and when super high molecular polyethylene is used as a matrix resin, microporous film made of polypropylene or polypropylene copolymer is used.

The temperature for laminating the microporous film on the compacted sheet is any temperature providing that it is higher than the melting point of polyolefin used as the matrix resin by at least 5° C. and lower than the melting point of the porous film as used, but usually the temperature higher than the melting point of the polyolefin resin as the matrix resin by 5°–50° C. is preferable, and the pressure is preferably 5–100 kg/cm².

The wall thickness of the plastic porous tube of the present invention is 1–200 mm, preferably 2–20 mm.

The porous tube of the present invention obtained according to the above exhibits a high separating ability, especially useful for a cylindrical filter because the average pore size of surface of the tube is not larger than 5 μm.

EXAMPLE

The present invention is concretely illustrated according to the following Examples.

Examples 1–2

Xanthane rubber 0.25 g was added in water 17.5 liter with stirring, and then glass fibers of average length of 6 mm ( Owens-Corning Fiberglas Corp., 415BB) 67 g for reinforcement were added in the above water with 5 minutes stirring to be dispersed.

Polyethylene (available from Sumitomo Seika K.K.) 100 g as a matrix resin and a solid latex 0.72 g were added in the dispersion as obtained, and then 0.5% (wt) solution of cationic coagulant (available from Betz Laboratories, Inc., trade name: Betz 1260) 63 g was gradually added to coagulate the dispersion to give a slurry.

The slurry obtained was added to a sheet-machine (Kumagaya Riki Kogyo K.K.) containing water 17.5 liter, and dehydrated on a screen of 0.18 mm to give a wet sheet, which was then lightly compressed and dried at 110° C. to remove the residual water to give a high density polyethylene sheet reinforced with glass fibers, which had a base weight of 325 g/m³. The weight of the glass fibers was 67 parts by weight based on 100 parts by weight of the polyethylene.

This sheet was cut to 2 square sheets (305×305 mm), and the square sheets were piled up on a continuous double belt laminator (available from Sandvik Corp.) followed by laminated under a pressure of about 2067 kPa at 205° C., and then cooled at 40° C. under pressure (about 2067 kPa) to produce a compressed sheet A, which was referred to as Sample A. The obtained compressed sheet A had a thickness of 0.5 mm, an apparent density of 1.22 g/cc, and a porosity of 4.2% by volume from the calculation.

A high density polyethylene compressed sheet reinforced with a glass fiber was obtained according to the above, which contains glass fibers of 3 mm fiber length 50% by weight and has a base weight (sheet weight/m²) of 150 g/m². Two sheets of the above were laminated with heat in the same way as the above to produce a compressed sheet B of 0.25 mm, which was referred to as Sample B. When this sheet B was heated at 175° C. in an infra-red oven for 90 seconds, complete thermal expansion was observed, and the expanded sheet had a apparent density of 0.36 g/cc.

The polyethylene sheet reinforced with glass fibers A and B were wound along the external surface of stainless cylinders (outside diameter: 40 mm) 4 times in A and 6 times in B respectively, and inserted into stainless cylinders (inside diameter: 50 mm) respectively.

These cylinders were held in a hot blast circulating oven at 150° C. for 30 minutes, and then cooled to room temperature. Cylindrical porous tubes a (Example 1) and b (Example 2) were obtained, which had a wall thickness of about 5 mm, and an expanded smooth surface respectively.

The features of these porous tubes a, b, are shown in Table 1.

Example 3–6

A compressed sheet having a thickness of 0.15 mm was prepared by pressing a sheet of base weight of 160 g/m² according to the Example 1, which was referred to as Samples C to F.

The Samples C and D were prepared from polypropylene (available from Mitsui Toatsu Chemicals, Inc.) as a matrix resin, into which glass fibers of average length of 6.4 mm and 3.2 mm respectively were added in the amount of about 40% by weight.

Samples E and F were prepared from phenol resin (available from Unitika Ltd.) as a matrix resin, into which carbon fibers (available from Toho Rayon Co., Ltd.) of average diameters of 6.4 and 3.2 mm respectively were added in the amount of about 40% by weight.

The fiber-reinforced sheets C-F obtained above were wound around the surface of stainless cylinders of external diameter of 100 mm by 7 times according to the similar manner to the Example 1, and the wound cylinders were inserted into stainless cylindrical molds of internal diameter of 105 mm respectively. These products were held in a hot blast circulating oven heated to 200° C. for 40 minutes, and then cooled to a room temperature.

After that the products were removed from the mold to give cylindrical porous tubes c (Example 3), d (Example 4), e (Example 5) and f (Example 6), each of which has a wall thickness of 2.5 mm, and a thermo-expanded smooth surface respectively.

The features of these porous tubes c-f were shown in Table 1.

Example 7

A sheet having a base weight of 200 g/m$^2$ was pressed according to the Example 1 to give a compression sheet of a thickness of 0.19 mm, which is referred to as Sample G.

Sample G contains polyethylene (available from Sumitomo Chemical Co., Ltd.) as a matrix resin and 40% by weight of alumina fibers of an average length of 3 mm (available from Nichias Corp.).

The fiber-reinforced sheet G thus obtained was wound around a stainless cylinder of external diameter of 40 mm by 8 times, and the wound cylinder was inserted into a cylindrical stainless mold having an internal diameter of 50 mm in a similar manner to the Example 1. The cylinder was held in a hot blast circulating oven at 180° C. for 20 minutes, and then cooled to a room temperature.

After that the product was removed from the stainless mold, and a cylindrical porous tube (Tube g) having a wall thickness of 4 mm and a thermo-expanded smooth surface.

The features of this porous Tube g were shown in Table 1.

Example 8

A sheet having a base weight of 200 g/m$^2$ was pressed according to the Example 1 to give a compression sheet of a thickness of 0.19 mm, which is referred to as Sample H.

Sample H contains phenol resin (available from Unitika Ltd.) as a matrix resin and 40% by weight of para-aramid fibers of an average length of 4 mm (available from du Pont-Toray, Inc.).

The fiber-reinforced sheet H thus obtained was wound around a stainless cylinder of external diameter of 40 mm by 7 times, and the wound cylinder was inserted into a cylindrical stainless mold having an internal diameter of 50 mm in a similar manner to the Example 1. The cylinder was held in a hot blast circulating oven at 200° C. for 40 minutes, and then cooled to a room temperature.

After that the product was removed from the stainless mold, and a cylindrical porous tube (Tube h) having a wall thickness of 4 mm and a thermo-expanded smooth surface.

The features of this porous Tube h were shown in Table 1.

Example 9

A sheet of a base weight of 300 g/m$^2$ was pressed according to the Example 1 to give a compression sheet having a thickness of 0.25 mm. The area of 160 mm from the end portion was laminated with a polypropylene microporous film (available from Tokuyama Soda Co., Ltd.) having an average pore size of 1 µm and a thickness of 0.1 mm to give a compression sheet, which was named as Sample I.

The Sample I contained polyethylene (available from Sumitomo Chemical Co., Ltd.) as a matrix resin and 50% by weight of glass fibers having an average length of 3 mm (available from Owens-Corning Fiberglas Corp.).

The fiber reinforced sheet I was cut to a suitable length, and then wound around a stainless cylinder of external diameter of 40 mm by 6 times so that the microporous film appeared on the most external surface, and the wound cylinder was inserted into a cylindrical stainless mold having an internal diameter of 50 mm in a similar manner to the Example 1. The cylinder was held in a hot blast circulating oven at 160° C. for 30 minutes, and then cooled to a room temperature.

After that the product was removed from stainless mold to give a cylindrical porous tube i having a wall thickness of 5 mm and thermo-expanded smooth surface.

The features of the porous tube i were shown in Table 1.

TABLE 1

| Sample | Example 1 | Example 2 | Example 3 | Example 4 | Example 5 | Example 6 | Example 7 | Example 8 | Example 9 | Comparative Example 3 |
|---|---|---|---|---|---|---|---|---|---|---|
| apparent gravity (g/cc) | 0.520 | 0.360 | 0.448 | 0.448 | 0.448 | 0.448 | 0.400 | 0.350 | 0.354 | 0.540 |
| continuous porosity (vol. %) | 59.3 | 74.2 | 63.4 | 63.4 | 68.7 | 68.7 | 70.6 | 73.8 | 74.0 | 40.0 |
| continuous pore (sec.) | 3.5 | 2.0 | 2.6 | 2.6 | 1.8 | 1.8 | 1.9 | 2.0 | 2.0 | 10 |
| compressive strength | 250 | 156 | 215 | 205 | 267 | 253 | 210 | 220 | 160 | 50 |

TABLE 1-continued

| Sample | Example 1 | Example 2 | Example 3 | Example 4 | Example 5 | Example 6 | Example 7 | Example 8 | Example 9 | Comparative Example 3 |
|---|---|---|---|---|---|---|---|---|---|---|
| (kg/m) impact resistance | Not damaged | Not damaged | Not damaged | Not damaged | Not damaged | Not damaged | Not damaged | Not damaged | Not damaged | Not damaged |

The features in Table 1 were determined according to the following methods:

(1) continuous pore

The time necessary for absorbing ethanol into a porous tube when the ethanol 1 cc is dropped onto the external surface of the porous tube by a pipet.

(2) compressive strength

A load is applied onto the both sides of the top and the bottom of samples (porous tubes) of 10 cm length, and the load when the tube is broken is determined. The compressive strength in Table 1 is the data converted to that of the sample of 1 m.

(3) impact resistance

A sample is dropped onto a concrete floor from a height of one meter, and observed it.

(4) average pore size

A Mercury Porosimeter Micromeritex 9320 (available from Shimadzu Corp.) is used.

As apparent from Table 1, the fiber-reinforced plastic porous tubes obtained in the Examples according to the present invention have continuous pores and high strength in spite of having a high continuous porosity.

Comparative Example 1

In the manner similar to Example 1, a glass fiber-reinforced high density polyethylene compressed sheet having a thickness of 1 mm and comprising 50% by weight of glass fibers of an average fiber length of 0.5 mm or 100 mm was prepared.

It has been tried to produce a cylindrical porous tube in the manner similar to Example 1, but the cylindrical porous tube could not be produced, because in any case the average fiber length and thermal expansion were both insufficient, and so the external diameter of cylindrical porous tube did not reach 50 mm.

Comparative Example 2

A glass fiber reinforced high density polyethylene compressed sheet having a thickness of 0.5 mm was prepared in the manner similar to Example 1 except that the amount of the glass fibers was 3% by weight (corresponding to 3.1 parts by weight) or 95% by weight (corresponding to 1900 parts by weight).

It was tried that a cylindrical porous tube was prepared from the obtained sheet according to the Example 1, but in case the amount of glass fibers was 95% by weight the obtained sheet was not so flexible that the sheet could not be wound around the external surface of the cylindrical tube, and a cylindrical porous tube could not be obtained.

In case the amount of glass fibers was 3 weight %, the thermal expansion was so insufficient that the external diameter of the cylindrical porous tube did not reach 50 mm, that was, a cylindrical porous tube could not be obtained.

Comparative Example 3

Features of the commercial product A (available from Daicel Chemical Industries, Ltd., trade name: Parlcone, which is plastic porous tubes produced by sintering powders such as polypropylene) were shown in Table 1.

The porous tube of the present invention contains continuous pores in the wall is, excellent in mechanical strength, smooth in both of external surface and internal surface, and can be used for structural materials for building or construction, various kinds of filters, diffusing tubes, drain materials and the like.

According to the present invention the continuous porosity can be optionally controlled and the porous tubes can be obtained.

We claim:

1. A fiber-reinforced porous plastic tube which comprises a matrix resin selected from the group consisting of polyethylene, chlorinated polyethylene, polypropylene and phenol resin, and fibers for reinforcement selected from the group consisting of glass fibers, carbon fibers, aramid fibers and alumina fibers having an average fiber length of 1–50 mm in an amount of 5–500 parts by weight of the fibers based on 100 parts by weight of the matrix resin, said fiber-reinforced porous plastic tube being produced by a process which comprises the following steps:

dispersing 100 parts by weight of the matrix resin and 5–500 parts by weight of the fibers for reinforcement in water to make a composite sheet, pressing the sheet under heat, cooling the sheet to compact the sheet, winding the compact sheet one or more times to shape the sheet into a tube, inserting the tube into a mold, and expanding the sheet with heat by heating the mold.

2. A fiber-reinforced porous plastic tube of claim 1, in which the average pore size of the porous plastic tube in the surface is not larger than 5 μm.

3. A fiber-reinforced plastic porous tube of claim 1, in which the average diameter of the fibers for reinforcement is 2–100 μm.

4. A process for production of a fiber-reinforced porous plastic tube comprising a matrix resin and fibers for reinforcement having an average fiber length of 1–50 mm in an amount of 5–500 parts by weight of the fibers based on 100 parts by weight of the matrix resin, which process comprises the following steps:

dispersing 100 parts by weight of a matrix resin and 5–500 parts by weight of fibers for reinforcement having an average fiber length of 1–50 mm in water to make a composite sheet, pressing the sheet under heat, cooling the sheet to compact the sheet, winding the compact sheet one or more times to shape the sheet into a tube, inserting the tube into a mold, and expanding the sheet with heat by heating the mold.

5. A process of claim 4, in which the average pore size of the porous plastic tube in the surface is not larger than 5 μm.

6. A process of claim 4, in which the tensile modulus of the fibers for reinforcement is higher than 1000 kg/mm$^2$.

7. A process of claim 4, in which the average diameter of the fibers for reinforcement is 2–100 μm.

8. A process of claim 4, in which the fibers for reinforcement are selected from the group consisting of glass fibers, carbon fibers, aramid fibers and alumina fibers.

9. A process of claim 4, in which the matrix resin is selected from the group consisting of polyethylene, chlorinated polyethylene, polypropylene and phenol resin.

10. A process for production of a fiber-reinforced porous plastic tube comprising a matrix resin and fibers for reinforcement having an average fiber length of 1–50 mm in an amount of 5–500 parts by weight of the fibers based on 100 parts by weight of the matrix resin, which process comprises the following steps:

dispersing 100 parts by weight of a matrix resin and 5–500 parts by weight of fibers for reinforcement having an average fiber length of 1–50 mm in water to make a composite sheet, laminating the sheet with a microporous film having an average pore size of not larger than 5 μm, winding the laminated sheet one or more times to form a tube, inserting the tube into a mold, and expanding the sheet with heat by heating the mold.

11. A process of claim 10, in which the tensile modulus of the fibers for reinforcement is higher than 1000 kg/mm$^2$.

12. A process of claim 10, in which the average diameter of the fibers for reinforcement is 2–100 μm.

13. A process of claim 10, in which the fibers for reinforcement are selected from the group consisting of glass fibers, carbon fibers, aramid fibers and alumina fibers.

14. A process of claim 10, in which the matrix resin is selected from the group consisting of polyethylene, chlorinated polyethylene, polypropylene and phenol resin.

* * * * *